United States Patent [19]

Roberts

[11] Patent Number: 4,692,484
[45] Date of Patent: Sep. 8, 1987

[54] EPOXY-PHOSPHATE/PHENOLIC ELECTROCOATING COMPOSITIONS

[75] Inventor: Donald R. Roberts, Roselle, Ill.

[73] Assignee: DeSoto, Inc., Des Plaines, Ill.

[21] Appl. No.: 779,947

[22] Filed: Sep. 25, 1985

[51] Int. Cl.⁴ .................... C08K 5/06; C08L 63/02; C08L 61/12

[52] U.S. Cl. .................... 523/414; 204/181.6; 523/424; 523/456

[58] Field of Search .................... 523/414, 424, 456

[56] References Cited

U.S. PATENT DOCUMENTS

| | | | |
|---|---|---|---|
| 4,341,678 | 7/1982 | Georgalas | 523/414 |
| 4,425,451 | 1/1984 | Sekmakas | 523/414 |
| 4,454,265 | 6/1984 | Tortorello | 523/414 |
| 4,461,857 | 7/1984 | Sekmakas | 523/414 |
| 4,484,994 | 11/1984 | Jacobs | 523/414 |
| 4,508,765 | 4/1985 | Ring | 523/424 |
| 4,585,814 | 4/1986 | Sekmakas | 523/414 |
| 4,598,109 | 7/1986 | Sekmakas | 523/414 |
| 4,638,020 | 1/1987 | Christenson | 523/414 |

FOREIGN PATENT DOCUMENTS 8300045  1/1983  World Int. Prop. O. .......... 523/414

*Primary Examiner*—C. Warren Ivy
*Attorney, Agent, or Firm*—Dressler, Goldsmith, Shore, Sutker & Milnamow, Ltd.

[57] ABSTRACT

Aqueous epoxy-free epoxy-phosphate coating compositions may be used to coat metal surfaces. The electrocoating of aluminum cans is particularly contemplated. The compositions provide rapid deposition on metal surfaces, excellent film build, good throwing power for spraying and excellent resistance to food products.

17 Claims, No Drawings

EPOXY-PHOSPHATE/PHENOLIC ELECTROCOATING COMPOSITIONS

TECHNICAL FIELD

The present invention relates to epoxy-phosphate/phenolic coating compositions suitable for coating metal surfaces. Compositions for electrocoating the surfaces of aluminum cans are particularly contemplated.

BACKGROUND OF THE INVENTION

Metal containers including aluminum cans are usually coated before use to protect the interior and exterior surfaces of the container from deterioration. It is conventional to coat the interior surfaces of the container with a coating composition that has a higher film weight than that of the coating composition applied to the exterior surfaces of the container so that the interior coating will be thicker.

The thicker interior coating protects the metal surfaces of the container from the contents of the container and also protects the contents of the container from reaction with the metal. The thinner exterior coating protects the container from ambient conditions by inhibiting the corrosion of the metal container. The exterior coating is also applied to improve the handling characteristics of the container and for aesthetic reasons.

The coating compositions have been applied by spray, roll or immersion methods or by using conventional electrocoating techniques. Electrocoating has many advantages in that the electrocoating process minimizes solvent emissions, maximizes coating utilization and provides uniform and consistent films.

As used herein, the term "electrocoating" includes the electrodeposition of resinous coating compositions on electrically conductive surfaces from either anodic or cathodic electrocoating material mediums. When a metal surface is contacted with a coating composition and an electrical potential is applied between the metal surface and an oppositely charged electrode, a layer of a coating composition may be electrodeposited on the metal surface.

A process and an apparatus for simultaneously electrocoating the interior and exterior surfaces of metal containers with different coating compositions at a high speed is disclosed in U.S. Pat. No. 4,400,251 to Heffner et al., which patent is assigned to the Aluminum Company of America.

Conventional epoxy/phenolic coating compositions provide hard, flexible and solvent resistant coatings which are desired for sanitary can coatings, but such coating compositions are relatively slow curing. As a result, production times are decreased relative to a rapidly curing composition. That is a definite disadvantage when such coating compositions are used with a high speed electrocoating apparatus of the type described in the above-referenced patent.

A need exists for an electrocoatable coating composition that forms a cured coating with the desired properties, but which possesses a relatively short cure time for use in the coating of metal surfaces including sanitary cans, and in particular, aluminum cans.

DESCRIPTION OF THE INVENTION

The present invention relates to aqueous epoxy-phosphate/phenolic coating compositions for application to metal surfaces. In particular, the coating compositions are intended to be electrodeposited on the surfaces of aluminum cans that are used, for example, to store food products.

The compositions under consideration include from about 5 percent to about 50 percent (preferably from 30 percent to 40 percent), based on the total weight of nonvolatile resin solids, of a water insoluble, heat-hardening phenol-formaldehyde resin curing agent. The balance of the resin solids consists essentially of an epoxy-free epoxy-phosphate. The compositions also include a volatile amine in an amount sufficient to react with about 50 percent to about 400 percent of the acid content of the epoxy-phosphate ester polymer.

A composition of this invention is prepared as an aqueous dispersion of the above materials with from about 20 percent to about 40 percent (preferably from 25 percent to 35 percent) nonvolatile resin solids based on the total weight of the dispersion. The dispersion is effected with the aid of a water miscible organic solvent comprising at least 10 percent by weight of an ether alcohol to provide organic solvent in a weight ratio relative to water of 5:95 to 50:50.

An aqueous composition of this invention, in the form of an aqueous electrocoating bath, provides rapid deposition on metal surfaces, excellent film build, good throwing power for application by electrocoating and excellent resistance to food products. As further described herein, the resin solids content of an electrocoating bath of this invention is in the range of about 2 percent to about 20 percent, preferably from about 5 to 15 percent, based on the total weight of the bath.

Throughout this specification and in the claims, all proportions are by weight, unless otherwise specified.

The phosphate groups of the epoxy-free epoxy-phosphate provide water dispersibility, an internal catalyst for the phenolic crosslinking reaction and rapid electrodeposition. The epoxy-free epoxy-phosphate may be prepared as described in U.S. Pat. No. 4,425,451 to K. Sekmakas, which patent is assigned to the present assignee, DeSoto, Inc., or it may be prepared in other ways, as illustrated hereinafter in the Examples.

The water insoluble, heat-hardening phenolformaldehyde resin curing agent provides excellent cure of the coating composition at about 200 degrees Centigrade (C.) for periods of only about 3 to 4 minutes. This relatively short cure time is a distinct advantage over conventional epoxy/phenolic resins which require a cure time of at least 6 to 10 minutes at that temperature to achieve comparable film properties. In a preferred embodiment, the water insoluble, heat-hardening phenol-formaldehyde resin curing agent is a butylated bisphenol A-formaldehyde resin.

Phenolic resins, especially the preferred bisphenol A-based phenolic resins, generally exhibit poor stability in aqueous dispersions. It is surprising to find that these phenolic resins exhibit good stability in aqueous media in combination with the epoxy-phosphates used herein.

According to the present invention, an epoxy-free epoxy-phosphate comprises the reaction product of a resinous polyepoxide with orthophosphoric acid (pyrophosphoric acid is considered an equivalent because it generates orthophosphoric acid) in an organic solvent solution. Only one of the hydroxyl groups of phosphoric acid appears to react, and based on that stoichiometry, excess 1,2-oxirane functionality is present in the polyepoxide to provide an epoxy-functional epoxyphosphate. The organic solvent is preferably a water miscible, alcoholic solvent, and 2-ethoxyethanol and 2-butoxyethanol are preferred. In one embodiment, more than 75 percent of the organic solvent is 2-ethoxyethanol.

Any organic solvent-soluble resinous polyepoxide may be used herein. By a polyepoxide is meant an epoxide having a 1, 2-epoxy equivalence of at least about 1.2. Diepoxides are preferred, especially diglycidyl ethers of bisphenols having a 1, 2-epoxy equivalence in the range of 1.3–2.0. The class of bisphenols is well known, and bisphenol A is usually used in commerce. Diglycidyl ethers of bisphenol A are commonly available in commerce and such commercial materials may be used herein. It is preferred to employ those bisphenols having an average molecular weight (by calculation) of from about 500, more preferably at least about 1000, up to about 5000. Epon 1004 from Shell Chemical Company, Houston, Tex. is described herein as illustrative. Epon 1007 and Epon 1001 (also available from Shell) further illustrate suitable polyepoxides.

The term "a bisphenol" is known to describe compounds of the formula:

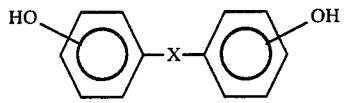

in which X is a straight chain or branched chain divalent aliphatic radical of from 1 to 3 carbon atoms, or $>SO_2$, $>SO$, or $—O—$.

The preferred bisphenol is bisphenol A (or 4,4'-isopropylidenediphenol) in which X is 2,2-propylidene and the two hydroxyl groups are in the para position. Other suitable bisphenols include 4,4'-thiodiphenol and 4,4'-sulfonyldiphenol.

A preferred embodiment of the invention will be described using a preferred diglycidyl ether of bisphenol A having a number average molecular weight of about 1800.

It is desired to point out that this invention reacts a polyepoxide with a stoichiometric deficiency of orthophosphoric acid based on the formation of an ester with only one of the three hydroxyl groups in the phosphoric acid (a monoester). Several points should be appreciated with respect to this monoester formation.

First, one of the three hydroxyl groups in orthophosphoric acid is much more reactive than the other two. It is well known that, as a result, under moderate reaction conditions, the reaction proceeds smoothly to cause monoester formation with all of the phosphoric acid without any significant involvement of the other two hydroxyl groups. All that is needed for this purpose is to heat the orthophosphoric acid (typically available as an 85 percent solution in water) with the epoxy resin in organic solvent solution at about 125 degrees C. The formation of the monoester is itself well known.

It is not necessary that all of the stoichiometric deficiency of acid be orthophosphoric acid so long as at least 0.1 mol of orthophosphoric acid is used for each oxirane equivalent in the polyepoxide. Carboxylic acids, such as acetic acid or dimethylolpropionic acid, may be used in place of a portion of the orthophosphoric acid. At least about 10 percent, preferably from about 30 percent to 80 percent, of the initial oxirane groups should not be reacted with phosphoric acid to minimize the acid content of the cured film.

It is appropriate to use the phosphoric acid in an amount such that the epoxy-phosphate contains from 0.05 mol to 0.9 mol of phosphoric acid per epoxide equivalent in the polyepoxide, which is preferably a diglycidyl ether as noted above. It is preferred to employ from 0.1 to 0.3 mol of orthophosphoric acid per epoxide equivalent in the polyepoxide.

It is desirable to minimize the proportion of phosphoric acid in order to provide the best resistance to chemical attack in the final cured coatings. Enough phosphoric acid must be used, however, to provide the desired curing catalysis and the required electrophoretic mobility.

It is the unreacted P-OH groups which are relied upon to provide dispersibility in water with the aid of a volatile amine. The reaction with phosphoric acid leaves some of the epoxy groups unreacted. These unreacted epoxy groups may be consumed in the presence of amines, hydrolyzed with water, esterified with monocarboxylic acids such as acetic acid of esterified with alcohols such as n-butanol, but they must be removed. Hydrolysis with water is particularly preferred. It is these unreacted epoxy groups which led to instability in the prior art aqueous dispersions which were formed, especially when phenolic resin curing agents were used, and such groups are not present herein.

It is desired to point out that the water insoluble phenolic resin curing agents used herein, especially those based on bisphenol, were previously characterized by poor stability in aqueous medium, but good stability is provided herein.

Water insoluble, water dispersible phenolic resins are themselves well known and are broadly useful herein. The water insoluble curing agents are heat-hardening formaldehyde condensates which are dispersed in the aqueous medium containing the epoxy-phosphate. Heat-hardening products employ at least about 1 mole of formaldehyde per mole of the phenol. Polymethylol phenols produced by the reaction with formaldehyde in alkaline medium may be used, but on may also a cresol-formaldehyde reaction product available in commerce containing about 1 mole of formaldehyde per mole of cresol. Ortho cresol is used in the cresol-formaldehyde resin available in commerce.

A preferred phenolic resin curing agent is a butylated bisphenol A-formaldehyde resin which, for example, may be prepared as described in Example 4 herein.

The curing agent should be used in an amount of from 5 percent to 50 percent of total nonvolatile resin solids, and it is preferred that at least about 30 percent of total nonvolatile resin solids is a phenolic resin curing agent.

The volatile amines which are used herein are well known. Dimethylethanol amine is preferred and will be used herein as illustrative, but many other amines are also useful. Thus, other amines, such as triethyl amine, and mono-, di-, or triethanol amine are all useful. Ammonia is commonly considered a volatile amine for the purpose at hand, but it is less preferred because its use produces lower solids content and requires a greater proportion of water miscible organic solvent.

The amine must be volatile since it is desired to remove as much of the amine as possible from the applied coatings by baking the same to provoke the desired cure.

Generally more amine is used herein than is normally required. This provides greater stability in the aqueous dispersion of this invention. It is preferred to use more amine than is required to remove all of the unreacted P-OH groups.

The need for water miscible organic solvents has previously been discussed. It is here pointed out that the final water dispersion will contain both organic solvent and water in a weight ratio of 5:95 to 50:50, preferably from 20:80 to 35:65.

The coatings herein can be applied in any desired fashion and are cured by baking. As described above, application by electrocoating is particularly contemplated. Baking removes volatile components, such as water, organic solvent and the volatile amine. The epoxy-free epoxy-phosphate serves as the catalyst for the cure, but extraneous catalysts, like p-toluenesulfonic acid may be used, though the use of such catalysts is not preferred since the water resistance of the composition may be impaired.

An aqueous electrocoating bath according to the invention is normally formulated to have a resin solids content in the range of about 2 percent to about 20 percent, preferably from about 5 to 15 percent, based on the total weight of the bath. The electrodeposited coatings or films formed of the foregoing aqueous dispersions are baked for curing at temperatures of about 200 degrees F to about 600 degrees F for periods that vary from about 20 seconds at the higher temperatures to less than 10 minutes at the lower temperatures.

In particular, a method of electrocoating a metal surface, such as an aluminum can, according to this invention comprises providing an aqueous dispersion as described above; passing a unidirectional electrical current through the dispersion to deposit a coating of the dispersion on the metal surface; removing the coated metal surface from the bath; and baking the coated metal surface.

When the metal surface to be coated is not immersed in an electrocoating bath, such as when the composition is sprayed onto the metal surface, the step of removing the coated metal surface from the bath is, of course, not performed. Rather, the composition is deposited on the metal surface, as by spraying, and the coated surface is baked at an appropriate temperature (e.g., 200 degrees F.) and time (e.g., 4–6 minutes) to cure the coating.

EXAMPLE 1

Preparation of Acrylic Polymer (Control)

A three neck flask fitted with a magnetic stirrer, a condenser, and a nitrogen inlet was charged with 1400 grams of 2-ethoxyethanol and 350 grams of n-butanol. The flask was heated to 120 degrees Centigrade (C.) with agitation in a nitrogen atmosphere. A mixture consisting of 223 grams styrene, 564 grams methacrylic acid, 963 grams ethyl acrylate and 53 grams t-butyl perbenzoate was added over a three hour period. The resulting mixture was allowed to react for one hour at 120 degrees C. Thereafter, additional t-butyl perbenzoate was added in 5 gram quantities until about 98 percent of the monomer was converted to polymer. The mixture was then cooled to room temperature (about 23 degrees C.).

EXAMPLE 2

Preparation of Acrylic/Epoxy Electrocoating Composition (Control)

A three gallon stainless steel pot was charged with 500 grams of the acrylic polymer solution from Example 1, 350 grams of Epon 1007 (Shell Chemical Co., Houston, Tex.) and 400 grams of Varcum 1410 (Reichhold Chemicals, Inc., White Plains, N.Y.), and the mixture was heated to about 80 degrees C. with high speed agitation. Epon 1007 is a diglycidyl ether of bisphenol A having an average molecular weight of about 3800 and an epoxy equivalent weight of about 1800. Varcum 1410 is an o-cresol-formaldehyde resin formed by reacting equimolar amounts of formaldehyde and o-cresol. The result is a blend of the copolymer, the epoxy resin and the formaldehyde resin. These components are essentially unreacted in the blend. Dimethylethanol amine (60 grams), 48 grams of n-butanol and 32 grams of 2-ethoxyethanol were added and resulting mixture was agitated for about 30 minutes. Deionized water (6292 grams) was then added over a one hour period with high speed agitation. The resulting coating contained about 13 percent nonvolatile resin solids dispersion and had a #4 Ford viscosity of 14 seconds.

EXAMPLE 3

Preparation of Epoxy-phosphate Polymer

A three neck flask with an agitator and a reflux condenser was charged with 633 grams of 2-ethoxyethanol, 30 grams of 85 percent orthophosphoric acid (in water) and 49 grams of deionized water. The mixture was heated to about 105 degrees C., and 1122 grams of a diglycidyl ether of bisphenol A having an average molecular weight of about 2000 and a 1,2-epoxy equivalency of about 2.0 (Epon 1004 may be used) were added over 1.5 hours. The mixture was allowed to react for 2 hours at about 105 degrees C. (to form an epoxy-free epoxy-phosphate), and then was cooled to room temperature (about 23 degrees C.).

EXAMPLE 4

Preparation of Phenolic Resin

A Three neck flask with a reflux condenser, an agitator and a nitrogen inlet was charged with 800 grams of bisphenol A, 520 grams of paraformaldehyde, 1800 grams of n-butanol and 6 grams of a 50 percent solution of sodium hydroxide. The mixture was heated with agitation at 110 degrees C. in a nitrogen atmosphere for about two hours to form a polymethylol derivative of bisphenol A. The mixture was then cooled to 40 degrees C., and 32 grams of a 40 percent nitric acid solution were added to the flask. The flask was fitted with a Dean Stark trap to remove water of condensation and was heated to 110 degrees C. Water was collected until about 312 grams of water were recovered during the formation of the butyl ether. The reaction mixture was cooled to 80 degrees C. A vacuum was applied to the flask and 1240 grams of unreacted butanol were collected from the reaction mixture. The mixture was cooled to 60 degrees C., and 390 grams of isopropanol were added. The mixture was then filtered through a filter press to remove the sodium nitrate salt that formed during the reaction. The resulting phenolic resin contained about 68 percent nonvolatile resin solids and had a viscosity of Y-Z on the Gardner-Holdt scale.

EXAMPLE 5

Preparation of Representative Electrocoating Composition

A one gallon stainless steel beaker was charged with 294 grams of the epoxy-free epoxyphosphate of Example 3, 182 grams of the phenolic resin of Example 4 and 21 grams of dimethylethanol amine. The mixture was agitated at high speed for 30 minutes. Deionized water (1473 grams) was then added over a one hour period. The resulting coating solution was a milky white dispersion, contained about 14 percent nonvolatile resin solids and had a #4 Ford viscosity of 14 seconds.

EXAMPLE 6

Preparation of Representative Electrocoating Composition

A one gallon stainless steel beaker was charged with 290 grams of the epoxy-free epoxy-phosphate of Example 3, 150 grams of Schenectady HRJ 1757 phenolic resin solution (Schenectady Chemicals, Inc., Schenectady, N.Y.) and 21 grams of dimethylethanol amine. The mixture was agitated at high speed for 30 minutes. Deionized water (1686 grams) was then added over a one hour period. The resulting coating solution was a milky white dispersion, contained about 14 percent nonvolatile resin solids and had a #4 Ford viscosity of 14 seconds.

EXAMPLE 7

Application Method for Electrocoating Cans

The coating compositions were applied as thin films to the interior surfaces of aluminum cans by electrocoating in the manner described in U.S. Pat. No. 4,400,251. Using a coating time of 0.5 seconds at about 175 volts, 5.4 or 5.6 milligrams of coating solids per square inch were deposited, depending on the sample. The cans were then cured by baking for about 4 minutes at a peak metal temperature of about 205 degrees C.

EXAMPLE 8

Preparation of Representative Electrocoating Composition

A one gallon stainless steel beaker was charged with 294 grams of the epoxy-free epoxy-phosphate of Example 3, 120 grams of Varcum 1410 phenolic resin and 21 grams of dimethylethanol amine. The mixture was agitated at high speed for 30 minutes. Deionized water (1710 grams) was then added over a one hour period. The resulting coating solution was a milky white dispersion, contained about 14 percent nonvolatile resin solids and had a #4 Ford viscosity of 13 seconds.

Physical test data of the coatings applied as described in Example 7 by electrocoating the compositions of Examples 2, 5 and 6 is shown in Table 1.

TABLE 1

| Physical Test Data for Various Examples | | | |
|---|---|---|---|
| | Coating Composition | | |
| Property | Example 2 | Example 5 | Example 6 |
| applied film (mg/in$^2$) | 5.4 | 5.6 | 5.6 |
| acetone double rubs | 11 | 100+ | 100+ |
| pencil hardness | 2H | 4H | 4H |
| Accelerated Food Packs[1] | | | |
| dog food | pass | pass | pass |
| peas | pass | pass | pass |
| tomatoes | fail | pass | pass |
| sauerkraut | fail | pass | fail |

[1]Cans were filled with the desired food product, and the filled cans were exposed to steam at about 120 degrees C. for about 90 minutes.

The cured films prepared from the coating compositions of Examples 2, 5 and 6 are hard, flexible and solvent-resistant. In particular, as shown above, the cured films had a pencil hardness of about 4H, were flexible and were able to resist more than 100 double rubs with an acetone-saturated cloth. Moreover, each coating composition can be applied over electrolytic tinplate, tin-free steel and aluminum.

However, the cured films of Examples 2, 5 and 6 performed differently when tested for stability in the presence of a variety of food products. In particular, accelerated food packs were prepared in aluminum cans that were coated as described above with the coating compositions of Examples 2, 5 and 6. In order of increasing acidity, a series of identically treated cans were packed with dog food, peas, tomatoes and sauerkraut.

In the accelerated food packs, the filled cans were exposed to steam at about 120 degrees C. for about 90 minutes. To pass the test the coating must continue to adhere to the can and no blushing should be observed.

Only the cans coated with composition of Example 5 passed testing with all four products. Cans coated with the composition of Example 6 failed testing with sauerkraut but passed testing with the other three less acidic food products. Cans coated with the composition of Example 2 only passed testing with the least acidic food products, dog food and peas.

Cure response testing was conducted by baking aluminum test panels electrocoated as described in Example 7 with the compositions from Examples 2, 5 and 8 for varying times. The amount of cure which occured during the bake was determined by measuring solvent resistance using the rub method.

The rub method uses a two-pound ball hammer. The ball end is covered with several layers of cheese cloth and is secured with a rubber band. The cheese cloth is then saturated with acetone and the coating surface is rubbed with the solvent-saturated cheese cloth making sure not to apply additional downward pressure. Rubbing strokes are repeated at the same location until the metal is exposed to view or 100 rubs are exceeded, whichever occurs first. Results are reported as the number of rubs to metal exposure or 100 if 100 rubs are exceeded without metal exposure. The results are shown in Table 2.

TABLE 2

| Comparative Cure Data as Measured by Acetone Solvent Rubs | | | |
|---|---|---|---|
| Cure Time (Minutes) | Example 2 (Solvent Rubs) | Example 8 (Solvent Rubs) | Example 5 (Solvent Rubs) |
| 1 | 1 | 1 | 1 |
| 2 | 4 | 10 | 100 |
| 3 | 11 | 16 | 100 |
| 4 | 11 | 22 | 100 |
| 6 | 12 | 33 | 100 |
| 8 | 16 | 49 | 100 |
| 10 | 25 | 57 | 100 |
| 16 | 48 | 60 | 100 |

The data in Table 2 demonstrate the more rapid cure time of a composition that includes the epoxy-free epoxy-phosphate of this invention.

In particular, the composition of Example 2 is an acrylic/epoxy composition which, when electrocoated on a metal surface according to the method of Example 7, required only 4 rubs with an acetone saturated cloth to expose the metal surface after a 2 minute cure and 48 rubs after a 16 minute cure.

The composition of Example 8 includes an epoxy-free epoxy-phosphate and a non-butylated phenolic resin. That composition required 10 rubs after a 2 minute cure and 60 rubs after a 16 minute cure to expose the metal surface.

On the other hand, a coating of the composition of Example 5 which includes an epoxy-free epoxy-phosphate and a butylated bisphenolic resin required over 100 rubs after only a cure of only 2 minutes to expose the metal surface.

What is claimed is:

1. An aqueous dispersion adapted for electrocoating metal surfaces comprising from about 5 percent to about 50 percent, based on the total weight of nonvolatile resin solids, of a water insoluble, heat-hardening bisphenol-A-based phenolic resin as curing agent; the balance of the resin solids consisting essentially of an epoxy-free epoxy-phosphate comprising the reaction product of orthophosphoric acid with a diglycidyl ether of bisphenol having an average molecular weight of from about 500 to about 5000 and a 1,2-epoxy equivalence in the range of about 1.3–2.0, said reaction product containing from about 0.05 mol to about 0.9 mol of phosphoric acid per epoxide equivalent in said diglycidyl ether; and a volatile amine in an amount sufficient to react with from about 50 percent to about 400 percent of the acid content of the epoxy-free epoxy-phosphate, said dispersion being effected with the aid of a water miscible organic solvent comprising at least about 10 percent of an ether alcohol to provide organic solvent in a weight ratio relative to water of about 5.95 to about 50:50.

2. The aqueous dispersion according to claim 1 including from about 20 percent to about 40 percent nonvolatile resin solids, based on the total weight of the dispersion.

3. The aqueous dispersion according to claim 1 including from about 25 percent to about 25 percent nonvolatile resin solids, based on the total weight of the dispersion.

4. The aqueous dispersion according to claim 1 wherein the epoxy groups remaining after formation of the reaction product are hydrolyzed with water.

5. The aqueous dispersion according to claim 1 wherein orthophosphoric acid is used in an amount of from 0.1 to 0.3 mol per epoxide equivalent and said diglycidyl ether is an ether of bisphenol A having an average molecular weight of at least 1000.

6. The aqueous dispersion according to claim 1 wherein said water insoluble, heat-hardening phenol-formaldehyde resin curing agent comprises from 30 percent to 40 percent of the aqueous dispersion, based on the total weight of nonvolatile resin solids.

7. The aqueous dispersion according to claim 1 wherein said bisphenol-A-based phenolic resin curing agent is a butylated bisphenol-A formaldehyde resin.

8. The aqueous dispersion according to claim 1 wherein said amine is dimethylethanol amine.

9. The aqueous dispersion according to claim 1 wherein said ether alcohol is 2-ethoxyethanol.

10. The aqueous dispersion according to claim 1 wherein said ether alcohol is 2-butoxyethanol.

11. The aqueous dispersion according to claim 1 wherein more than 75 percent of the organic solvent is 2-ethoxyethanol.

12. An electrocoating bath having from about 2 percent to 20 percent by weight of nonvolatile resin solids, based on the total weight of the bath, including an aqueous dispersion comprising from about 5 percent to about 50 percent, based on the total weight of nonvolatile resin bisphenol-A-based phenolic resin as curing agent; the balance of the resin solids consisting essentially of an epoxy-free epoxy-phosphate comprising the reaction product of orthophosphoric acid with a diglycidyl ether of bisphenol A having an average molecular weight of at least about 1000 and a 1,2-epoxy equivalence in the range of about 1.3–2.0, said ester containing from about 0.1 mol to about 0.3 mol of phosphoric acid per epoxide equivalent in said diglycidyl ether; and a volatile amine in an amount sufficient to react with from about 50 percent to about 400 percent of the acid content of the epoxy-free epoxy-phosphate, said dispersion being effected with the aid of a water miscible organic solvent comprising at least about 10 percent of an ether alcohol to provide organic solvent in a weight ratio relative to water of about 5:95 to about 50:50.

13. The electrocoating bath according to claim 12 wherein said bath includes from 5 percent to 15 percent by weight of nonvolatile resin solids, based on the weight of the bath.

14. The electrocoating bath according to claim 12 wherein said amine is dimethylethanol amine.

15. The electrocoating bath according to claim 12 wherein said ether alcohol is 2-ethoxyethanol.

16. The electrocoating bath according to claim 12 wherein said ether alcohol is 2-butoxyethanol.

17. The electrocoating bath according to claim 12 wherein more than 75 percent of the organic solvent is 2-ethoxyethanol.

* * * * *

UNITED STATES PATENT AND TRADEMARK OFFICE
CERTIFICATE OF CORRECTION

PATENT NO. : 4,692,484

DATED : September 8, 1987

INVENTOR(S) : Donald R. Roberts

It is certified that error appears in the above-identified patent and that said Letters Patent is hereby corrected as shown below:

Column 9, line 36 (Claim 3, line 2), change "from about 25 percent to about 25 percent" to:

--from about 25 percent to about 35 percent--

Column 10, line 20 (Claim 12, line 6), after "resin" (first occurence), insert:

--solids, of a water insoluble, heat-hardening--

Signed and Sealed this

Twelfth Day of January, 1988

Attest:

DONALD J. QUIGG

Attesting Officer

Commissioner of Patents and Trademarks